(12) United States Patent
Leemans et al.

(10) Patent No.: US 7,388,067 B2
(45) Date of Patent: Jun. 17, 2008

(54) POLYESTER COMPOSITION COMPRISING POLYBUTYLENE TEREPHTHALATE RESIN

(75) Inventors: Luc E. F. Leemans, Kortessem (BE); Wouter Gabrielse, Maastricht (NL); Gerard H Werumeus Buning, Oirsbeek (NL); Eric J. H. E. Coenen, Berg en Terblijt (NL); Hendrikus L. Nelissen, Nieuwstadt (NL); Robert A. Heynderickx, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 241 days.

(21) Appl. No.: 10/557,815

(22) PCT Filed: May 27, 2004

(86) PCT No.: PCT/NL2004/000383

§ 371 (c)(1),
(2), (4) Date: Dec. 19, 2005

(87) PCT Pub. No.: WO2004/106405

PCT Pub. Date: Dec. 9, 2004

(65) Prior Publication Data

US 2006/0270824 A1    Nov. 30, 2006

(30) Foreign Application Priority Data

May 28, 2003   (EP) .................... 03076637

(51) Int. Cl.
C08G 63/00   (2006.01)
C08G 63/02   (2006.01)

(52) U.S. Cl. .............. 528/301; 264/176.1; 264/219; 369/642; 428/411.1; 428/412; 525/437; 528/271; 528/272

(58) Field of Classification Search ............. 264/176.1, 264/219; 369/642; 428/411.1, 412; 525/437; 528/271, 272
See application file for complete search history.

(56) References Cited

U.S. PATENT DOCUMENTS

| 4,258,142 A * | 3/1981 | Ohzeki et al. ............... 524/141 |
| 4,463,113 A * | 7/1984 | Nakahara et al. ........... 524/117 |
| 2002/0075686 A1 | 6/2002 | Kosugi et al. |

FOREIGN PATENT DOCUMENTS

| EP | 0 683 191 | 11/1995 |
| EP | 0 834 524 | 4/1998 |
| EP | 1 016 692 | 7/2000 |
| EP | 1 262 523 | 12/2002 |
| GB | 2 017 127 | 10/1979 |

OTHER PUBLICATIONS

Database WPI XP 002257670 & JP 11 101905, Apr. 13, 1999.
Database WPI XP 002257671 & JP 11 061382, Mar. 5, 1999.
Database WPI XP 002257672 & JP 2000 198836, Jul. 18, 2000.
Database WPI XP 002257673 & JP 2000 035509, Feb. 2, 2000.
International Search Report.

* cited by examiner

Primary Examiner—Terressa M Boykin
(74) Attorney, Agent, or Firm—Nixon & Vanderhye P.C.

(57) ABSTRACT

Polyester compositions and methods to prepare and use such compositions are provided. The polyester compositions include a polybutylene terephthalate resin (PBT) and at least one additive, and have a cyclic dimer content of less than 0.35 wt. % relative to the weight of the PBT. Molded parts prepared from such polyester compositions, and mirror optic systems such as headlights for motor vehicles or garden reflector lights which include the molded parts are also described.

19 Claims, 1 Drawing Sheet

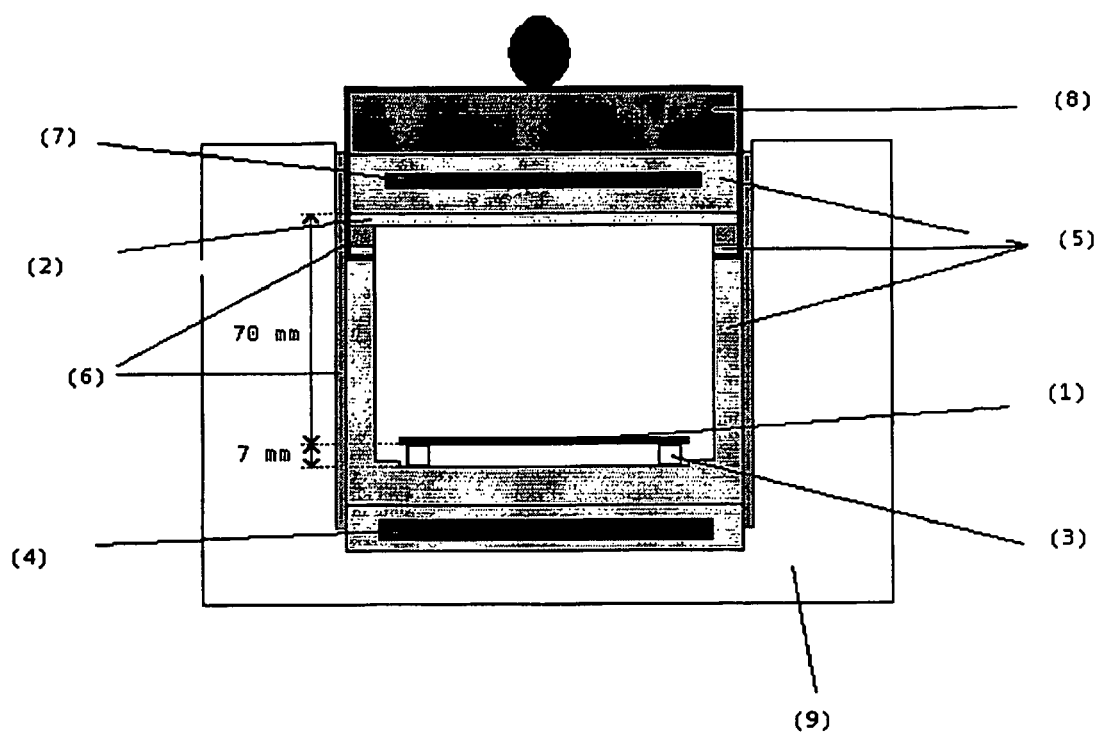
Figure 1: Outgas oven set up

POLYESTER COMPOSITION COMPRISING POLYBUTYLENE TEREPHTHALATE RESIN

This application is the US national phase of international application PCT/NL2004/000383 filed 27 May 2004 which designated the U.S. and claims benefit of EP 03076637.2, dated 28 May 2003, the entire content of which is hereby incorporated by reference.

The invention relates to a polyester composition comprising a polybutylene terephthalate resin (PBT) and at least one additive, more particular to a polyester composition that is suitable for preparing moulded parts that can be used in mirror optic systems such as headlights for motor vehicles and reflector lamps comprising energy saving lamps.

Polyester compositions based on thermoplastic polyesters are widely used for preparing various moulded articles. Polymer compositions, based on other thermoplastic materials of different nature, are frequently used in headlights of cars to replace metal parts, initially only in the less critical parts, such as the casing, but more and more also in the more critical parts such as the bezel and the reflector, which latter parts require the use of high heat resistant materials. For these applications PBT comprising compositions could be an option. A problem, however, with PBT, like many other plastics used in headlights for cars, is that it gives rise to fogging. Fogging is in the context of this application understood to be the deposition of volatile compounds, originating from the plastic composition and volatilised by the heating of the lamp under operating conditions, on cold spots such as the lens of the headlight. Measures applied to reduce fogging include, for example, exclusion of solvents in the composition; thinner designs for the moulded parts, thus reducing the amount of material contributing to fogging; and insulating the part by applying a coating. Another solution relates to special designs of the moulded part, or of the mirror optic system as a whole, as a result of which an internal air flow is induced when the vehicle is moving and the material contributing to fogging is guided away from the critical part, thus resulting in reduced deposition of the material contributing to fogging on that part. Fogging is undesirable because it reduces the transparency of the lens and reduces the yield of the light of the headlight. Moreover, it is aesthetically unattractive, since it takes away the clear view of a passant of a car on the nice and shiny look of the reflectors reflecting the advanced technology incorporated in the car.

The aim of the invention is to provide a polybutylene terephthalate composition that intrinsically gives rise to reduced fogging when used in a part in a mirror optic system.

This object has been achieved with the polyester composition according to the invention, wherein the composition has a cyclic dimer content of less than 0.35 wt. % relative to the weight of the PBT.

The effect of the composition according to the invention is that when it is used for the production of a moulded part for a mirror optic system, such as a bezel for a headlight of a car, the part gives rise to less fogging than a comparable part made of a composition comprising a standard PBT.

A polyester composition comprising a polybutylene terephthalate resin, that is used to make optical reflectors for cars, is known from JP-A-11101905. The known composition comprises a PBT having a limited amount of carboxylic end groups, as well as an inorganic filler and a quantity of polycarbonate next to the PBT. The problem that is adressed in JP-A-11101905 is that of release of volatile components in a continuous moulding process for producing the optical reflectors, resulting in mould deposits causing cloudiness and reduced brightness of the optical reflectors as produced upon extended production time. This problem is said to be solved by the limited amount of carboxylic end groups and the presence of the polycarbonate. JP-A-11101905 does not relate to the problem of fogging in headlights for cars during the lifetime of the car. JP-A-11101905 does not teach the measures according to the invention, i.e. a cyclic dimer content of less than 0.35 wt. %, relative to the weight of the PBT, nor the effects thereof of reduced fogging as according to the invention.

In the context of the present invention "cyclic dimer" is understood to be the cyclic ester product of two butanediol units and two terephthalic acid units. It has been found by the inventors that the problem of fogging of PBT containing compositions is largely influenced by the cyclic dimer content in the PBT.

In the composition according to the invention the cyclic dimer content preferably is less than 0.30 wt. %, more preferably less than 0.25 wt. %, and most preferably less than 0.20 wt. % relative to the weight of the PBT. The advantage of a lower cyclic dimer content is that fogging of parts made of the composition is even further reduced.

Polybutylene terephthalate resin (further herein referred to as PBT) is understood in the context of the present invention to be the condensation product of butanediol and terephthalic acid, obtainable by direct esterification, or of butanediol and the dimethyl ester of terephthalic acid, obtainable by transesterification, thus comprising the esterified residues of butanediol and terephthalic acid. The PBT may optionally be a copolymer comprising other components next to the esterified residues of butanediol and terephtalic acid, such as the esterified residues of other diols and dicarboxylic acids, as well as small amounts of polyfunctional alcohols or carboxylic acids. The PBT in the composition according to the invention typically contains at least 70 wt. % of esterified residues of butanediol and terephthalic acid, relative to the weight of the PBT.

Suitable diols that may be comprised in the PBT, are, for example, ethylene glycol, diethylene glycol, propylene glycol, 2,3-pentanediol, neopentylglycol, hexamethylene glycol, and cyclohexanedimethanol.

Suitable dicarboxylic aicds are, for example, ortho-phthalic acid, isophthalic acid, naphthalene dicarboxylic acid, adipic acid, sebacic acid, and succinic acid.

Suitable polyfunctional carboxylic acids that can be used here are, for example, trifunctional carboxylic acids (such as trimesic acid and trimellitic acid) and tetrafunctional carboxylic acids (such as pyromellitic acid).

Suitable polyfunctional alcohols are, for example, triols (such as glycerol, trimethylol ethane, and trimethylol propane), and tetrols (such as pentaerythritol).

Generally, the polyfunctional compounds, if any, are used in very low amounts to give the PBT a little degree of branching.

Generally, the PBT comprises the other components in an amount of less than 5 wt. %, preferably less than 1 wt. %, even more preferably less than 0.5 wt. %, relative to the weight of the PBT and most preferably no other components at all. A lower amount of other components is preferred in order to better maintain the fast crystallization speed and/or the high heat dimensional stability properties of PBT.

The PBT that can be used in the composition according to the invention may be any PBT, provided that either the PBT has a cyclic dimer content of less than 0.35 wt. %, relative to the weight of the PBT, or that the composition comprising the PBT can be converted into a composition with such a low cyclic dimer content. As is found by the inventors, a PBT having a cyclic dimer content of less than 0.35 wt. %, relative to the weight of the PBT, may be prepared, for example, via a melt polymerization process, followed by a heat treatment step.

In a melt polymerization process butanediol and terephthalic acid, or butanediol and the dimethyl ester of terephthalic acid, and optional other diols and/or diacids, and optional polyfunctional alcohols or carboxylic acids are cocondensed above the melt temperature of the PBT. The preparation of PBT by melt polymerization can take place both in a discontinuous (batch) and in a continuous process, and generally comprises two phases, a first phase under atmospheric pressure, followed by a second phase under reduced pressure. Such a polymerization process is well known to the man skilled in the art, and described for example in Encyclopedia of Polymer Science and Engineering, Vol. 12, pages 43-45, Wiley Interscience, New York, 1988 (ISBN 0-471-80994-6) and Kunststoff Handbuch 3/1, Technische Thermoplaste, Polycarbonate, Polyacetale, Polyester and Celluloseester, page 22-23, Hanser Verlag, München, 1992 (ISBN 3-446-16368-9).

Such a PBT prepared by melt polymerisation generally comprises about 0.45 wt. % cyclic dimer relative to the weight of the PBT, as is observed during the experimental work to arrive at the present invention. To achieve a cyclic dimer content of less than 0.35 wt. %, relative to the weight of the PBT, the PBT obtained by melt polymerisation may, for example, be subjected to a heat treatment wherein the PBT is heated in solid form in an inert gas atmosphere to a temperature between 150° C. and said melting temperature, and maintained at a temperature within 150° C. and said melting temperature for a time sufficiently long to attain the indicated low level of cyclic dimer content.

In the context of the invention, an inert gas atmosphere is understood to be an atmosphere comprising a very low amount of oxygen, which amount does not give rise, or not in a significant extent, to degradation of the PBT under the temperature conditions applied to the PBT. Generally, such an inert gas atmosphere comprises less than 0.1 wt. % oxygen, preferably less than 0.02 wt. % oxygen, more preferably less than 0.01 wt. % oxygen, relative to the weight of the gas atmosphere. Most preferably the inert gas is free of oxygen.

Preferably, the PBT in the composition according to the invention has a residual carboxylic acid content, expressed as the acid number, of at most 50 meq/kg, more preferably at most 40 meq/kg, and even more preferably at most 30 meq/kg relative to the weight of the PBT. The advantage of a polyester composition comprising a PBT with a lower residual carboxylic acid content is that a moulded part made from that composition gives even less fogging.

The PBT that can be used in the composition according to the invention may have a relative viscosity varying over a wide range. Generally the PBT has a relative viscosity, measured on a 0.5 wt % solution in metacresol at 25° C. (and further herein indicated as $\eta_{rel}$), from 1.7 to and including 2.3, though a PBT with a lower as well as with a higher $\eta_{rel}$ may be used as well. Preferably, the $\eta_{rel}$ of the PBT is at least 1.7, more preferably at least 1.8 and even more preferably at least 1.9. The advantage of a higher $\eta_{rel}$ is that a moulded part prepared from the composition has a higher toughness. This is particularly emphasized when the composition does not comprise a reinforcing agent. Also preferably, the $\eta_{rel}$ of the PBT is at most 2.3, more preferably at most 2.2 and even more preferably at most 2.1. The advantage of a lower $\eta_{rel}$ is that the composition has better processing properties.

The composition according to the invention comprises, next to the PBT, at least one additive. The at least one additive may be any additive, or additives, that is, or are, generally used in compositions for preparing moulded parts. Suitable additives, that can be used in the composition according to the invention are, for example, fillers, reinforcing agents, pigments or pigment concentrates, flame retardants, stabilizers, processing aids, impact modifiers, and polymers different from PBT that can be blended with PBT. Typically, the additive does not comprise solvents, does not decompose at the temperature of the part under normal heat conditions and is not itself a volatile, low molecular weight, material. The choice of additive, or additives, will depend on the intended application of the moulded part and on the specific properties required for that part, and can easily be chosen by the man skilled in the art of preparing compositions for making moulded parts.

The inorganic filler can be any filler that is known to the skilled man in the art of making polyester compounds. Suitable inorganic fillers are, for example, mineral fillers, such as talcum and calcium carbonate.

Suitable reinforcing agents are, for example, glass fibres, carbon fibres, glass pearls and nanofillers.

Inorganic fillers and/or reinforcing agents are advantageously used in compositions according to the invention for preparing moulded parts with improved dimensional stability at elevated temperature and/or improved mechanical properties.

Suitable pigments are, for example, titanium dioxide and carbon black.

Suitable flame retardants are, for example, halogenated resins and melamine polyphosphates.

Suitable stabilizers are, for example, oligomeric antioxidants and UV-absorbers.

Suitable processing aids are, for example, lubricants, also known as mould release agents, such as polyethylene waxes. ester based waxes, like montanic waxes and stearate waxes, (e.g. pentaerytrytoltetrasterate), and carnauba waxes.

Suitable impact modifiers are, for example, functionalized polyethylene rubbers and elastomers such as copolyetheresters.

Suitable polymers that can be blended with PBT are, for example, polyethyleneglycolterephthalate (PET) and polycarbonate (PC).

The composition according to the invention generally comprises at least 50 wt. % PBT, relative to the weight of the composition. Preferably, the amount of PBT in the composition is at least 70 wt. %, more preferably at least 90 wt. %, even more preferably at least 95, and most preferably at least 99 wt. % PBT, relative to the weight of the composition. The advantage of a higher PBT content in the composition is that the effect of the reduction in fogging is further enhanced. Furthermore, the composition having a higher PBT content can be used for making parts having higher gloss.

The additive is generally present in an amount of at least 0.01 wt. % relative to the weight of the composition.

Preferably, the additive in the composition, when present in the composition in the form of discrete particles, has a particle size of less then 10 μm, more preferably less than 2 μm, even more preferably less than 1 μm and most preferably less than 0.5 μm. The particle size may be as low as 10 Å, or even lower, as can be the case with nanofillers. The advantage of the composition according to the invention comprising an additive with a smaller particle size is that it can be used for preparing moulded parts with a higher surface gloss.

For applications requiring very high gloss surfaces, the composition preferably comprises a very low amount, if any, of an additive, or additives, that is, or are present in the form of discrete particles in the composition.

Generally, the composition comprises as the at least one additive a processing aid, more particular a lubricant. The amount of lubricant in the composition according to the invention is generally at most 0.5 wt. %, relative to the weight of the composition. Preferably, the composition according to the invention comprises at most 0.30 wt. %, more preferably at most 0.20 wt. % of lubricant, relative to the weight of the composition. The advantage of the composition comprising a lower wt % of lubricant is an even better fogging behavior.

In a preferred embodiment of the invention, the composition comprises a lubricant with a weight loss factor of at most 1 wt. %, more preferably at most 0.5 wt. %, and even more preferably at most 0.2 wt. %, relative to the weight of the lubricant. The weight loss factor is defined as the weight loss, relative to the initial weight, determined by isothermal thermogravimetric analysis (TGA) at 160° C. under nitrogen after 4 hours. It has been found, that despite the low amount of lubricant generally used in the composition, a lubricant with a low weight loss factor can already be critical for the fogging behaviour of the compound, and that the fogging behaviour can be further improved by using a lubricant with lower weight loss factor.

In a further preferred embodiment of the invention, the composition consists of a PBT, a lubricant and a pigment concentrate.

The polyester composition according to the invention can be prepared, for example, by mixing a PBT having a cyclic dimer content of less than 0.35 wt. % relative to the weight of the PBT and at least one additive. For the preparation of the composition in this way, any customary manner for preparing moulding compositions may be used, such as by blending the various components in a suitable mixing device. Suitable devices are, for example, extruders, preferably twin-screw extruders. The mixing of a PBT, having a cyclic dimer content of less than 0.35 wt. % relative to the weight of the PBT and the at least one additive for preparing the composition according to the invention will be further herein referred to as a-posteriori mixing. Such an a-posteriori mixing step typically involves a melt-mixing step. The components and process conditions for such a melt mixing step are typically chosen in such a way that the increase in cyclic dimer content is limited and the final cyclic dimer contents remains less than 0.35 wt. % relative to the PBT. Suitable processing conditions for this purpose can easily be selected by the man skilled in the art by trial and error. Suitable processing conditions are, for example, melt mixing at a temperature of at most 250° C. for at most 15 minutes, starting with a PBT having a cyclic dimer content of at most 0.32 wt %.

The polyester composition according to the invention may also be prepared by mixing a PBT obtained by melt-polymerization and the at least one additive, to obtain a PBT containing composition and then subjecting the PBT containing composition in solid form in an inert gas atmosphere to a temperature between 150° C. and the melting temperature of the PBT, and maintaining the composition at a temperature between 150° C. and said melting temperature for a time sufficiently long to attain a cyclic dimer content of less than 0.35 wt. %, relative to the weight of the PBT.

Preferably, the process comprises melt-mixing of a melt of PBT, obtained by melt polymerization, directly with the at least one additive. This process, wherein the at least one additive is directly mixed into the polymer melt obtained after the melt-polymerization, has the advantage that a cooling step and a second melting step as is needed in the process comprising an a-posteriori mixing step, can be omitted. A further advantage is that the risk of reformation of cyclic dimer during such an a-posteriori mixing step, thereby increasing the cyclic dimer content again is eliminated.

The invention also relates to a PBT, having a cyclic dimer content of less than 0.35 wt. % relative to the weight of the PBT. This resin can advantageously be used in the composition according to the invention having the effect of reduced fogging compared to a standard PBT obtained by melt polymerization. Preferably the PBT has a cyclic dimer content of less than 0.30 wt. %, more preferably less than 0.25 wt. %, and most preferably less than 0.20 wt. % relative to the weight of the PBT.

The PBT according to the invention preferably has a $\eta_{rel}$ between 1.7 and 2.3, more preferably between 1.8 and 2.2, and even more preferably between 1.9 and 2.1. The PBT also preferably has a residual carboxylic acid content, expressed as the acid number, of at most 50 meq/kg, more preferably at most 40 meq/kg, and even more preferably at most 30 meq/kg relative to the weight of the PBT.

The invention also relates to a process for the preparation of a PBT according to the invention. In this process a PBT, having a melt temperature and obtained by melt polymerization above said melt temperature, is heated in solid form in an inert gas atmosphere to a temperature between 150° C. and said melting temperature, and maintained at a temperature between 150° C. and said melting temperature for a time sufficiently long to attain a cyclic dimer content of less than 0.35 wt. %, relative to the weight of the PBT.

Preferably, the PBT is heated to and maintained at a temperature between 160° C. and 210° C., more preferably between 170° C. and 200° C. The advantage of a higher minimum temperature is that the time needed for obtaining the required cyclic dimer content is shorter. The advantage of a lower maximum temperature is that there is less risk of sticking of solid particles of PBT.

Also preferably, the PBT is maintained at the indicated temperature for a time sufficiently long to attain a cyclic dimer content of less than 0.30 wt. %, more preferably less than 0.25 wt. %, and most preferably less than 0.20 wt. %, relative to the weight of the PBT. This has the advantages for the fogging behaviour as described above.

Some other preferred embodiments of the process according to the invention relate to a PBT, obtained with said process, having the features of any of the preferred embodiments of the PBT according to the invention described above.

In another preferred embodiment of the process according to the invention the inert gas atmosphere has a pressure of less than 10 kPa, more preferably less than 1 kPa, even more preferably less than 500 Pa. A lower pressure has the advantage that the required cyclic dimer content is obtained in shorter time. This allows a more efficient production process with a higher yield, without the need of extending the production installation.

In a further preferred embodiment a gas stream is applied. Also with this preferred embodiment the required cyclic dimer content is obtained in shorter time.

In another preferred embodiment, the PBT used as starting material has an $\eta_{rel}$ of at most 2.0, preferably at most 1.9, more preferably at most 1.85. Use of a PBT starting material having a lower $\eta_{rel}$ has the advantage that, while maintaining the $\eta_{rel}$ of the obtained PBT at the same level, a PBT with a lower cyclic dimer content can be obtained.

Generally, the PBT used as starting material has an $\eta_{rel}$ of at least 1.5, though a PBT with a lower $\eta_{rel}$ may be used as well. Preferably, the initial $\eta_{rel}$ is at least 1.65, more preferably at least 1.75, since this shortens the time needed for obtaining the ultimately required $\eta_{rel}$.

The process for preparing the PBT according to the invention may be carried out by any mode and in any apparatus suitable for that purpose. The process can suitably be carried out, for example, as a batch process (e.g. in a tumble dryer) or as a continuous process (e.g. in a moving bed reactor).

In a preferred embodiment of the process according to the invention, the PBT that is subjected to the heat treatment already comprises all other components comprised in the polyester composition aimed for, including the at least one additive. The advantage is that this directly results in the polyester composition according to the invention and an a-posteriori compounding step can be mixed.

The at least one additive can be any of the usual additives, mentioned above. Preferably the at least one additive is a lubricant.

The invention also relates to the use of a PBT obtainable by the process according to the invention for the preparation of a composition according to the invention.

The invention also relates to the use of a polyester composition according to the invention for the preparation of a moulded part, and to a moulded part prepared from a polyester composition according to the invention. The advantage of such a moulded part is, that it gives less fogging when used in an application wherein the part is subject to heating under normal use conditions, compared to a moulded part made of a standard PBT containing composition.

In a special embodiment the moulded part is a part for a headlight for a motor vehicle, such as a bezel or a reflector, or a lamp base for an energy saving lamp.

The invention further relates to the use of a moulded part according to the invention in assembling a mirror optic system, and to a mirror optic system comprising a moulded part according to the invention. In a particular embodiment of the invention, the mirror optic system is a headlight for a motor vehicle or a garden reflector lamp.

The invention also relates to a motor vehicle comprising a headlight according the invention, in particular a truck, a passenger's car or a motorbike. The advantage of a motor vehicle comprising a headlight according the invention is that during the life time of the motor vehicle, less fogging of the headlight occurs, as a result of which the yield of the light is better retained and the road-users remain better secured, compared to a motor vehicle comprising a headlight made of a standard PBT containing composition.

The invention is further illustrated with the following examples and comparative experiments.

Analytical Methods

Cyclic dimer content: An amount of PBT or PBT containing composition of 200-300 mg was dissolved at room temperature in 10 ml of hexafluoroisopropanol. This solution was analysed by high performance liquid chromatography. The column used was a ZORBAC SB C18 (250*3 mm). A gradient with 10 mM $H_3PO_4$ and acetonitril at 40° C. and flow of 0.5 ml/min was applied; acetonitril varied from 40% to 100% during elution. Detection was done with a diode array detector set at 238 nm Relative viscosity ($\eta_{rel}$): mehod based on ISO 3007, third edition 1994-09-01; The measurement was done by measuring the flow time of a PBT solution in metacresol, 0.5 wt. %, at 25° C. in an Ubbelohde tube and dividing the resulting time by the time measured for pure metacresol.

Carboxylic acid number: determined by photometric titration of a solution of PBT in orthocresol/chloroform mixture (70:30 weight by weight) with 0.05 KOH in ethanol, using bromocresolgreen as the indicator.

Weight loss factor: a sample of ca. 10 mg of lubricant was weighed and placed in a thermogravimetric analysis apparatus (TGA) (PERKIN ELMER TGA 7). The TGA measurement was carried out in isothermal mode in helium atmosphere at a temperature of 160° C. during 4 hours. At the end of that period the weight loss was measured in weight % relative to the initial weight and reported as the weight loss factor.

| Materials | |
|---|---|
| Lubricant A: | LICOWAX OP (ex Clariant, Germany); Montanic ester based wax (weight loss factor 1.14 wt. %) |
| Lubricant B: | RADIA 7176 (ex OLEON, Belgium) Pentaerythritoltetrastearate (weight loss factor 0.58 wt. %); |
| Lubricant C: | PARACERA C40 (ex Paramelt B.V., The Netherlands) Carnaubawax (weight loss factor 0.30 wt. %) |
| Pigment concentrate: | Carbon black concentrate in PBT |
| 1,4-Butanediol: | Polymerization grade |
| Dimethylterephthalate: | Polymerization grade |

Processing

Preparation of PBT by Melt-Polymerization

A 20 L reactor equipped with stirrer and condenser was charged with 7060 g dimethylterephthalate, 4100 g 1,4-butanediol and 85.0 g of a titanium tetra n-butoxide catalyst solution in 1,4-butanediol (40 mg catalyst per gram solution). After 3 times flushing of the reactor with nitrogen, the reactor content was heated gradually under stirring and atmospheric pressure within one hour to a temperature of 150° C., kept at this temperature for half an hour, and subsequently heated further within 2 hours to a temperature of 235° C. The thus obtained transesterified product was then further polymerised at 240° C. under reduced pressure (50-100 Pa) for 120 minutes at a stirring speed of 20 RPM. The polymerised product was extruded from the reactor, under nitrogen pressure, in the form of a strand, cooled in water and pelletized in a pelletizer. The $\eta_{rel}$ and acid number of the polymer were determined to be 1.85, respectively 18 meq/g. The polymer had a cyclic dimer content of 0.45 wt. %.

Preparation of PBT Composition by Compounding

Different compositions, comprising the PBT obtained by melt polymerization, the pigment concentrate and one of the lubricants A, B and C, were prepared on a ZSK 30/34 twin-screw extruder from Werner and Pfleiderer. Barrel temperature was set at 260° C., screwspeed was 325 RPM and yield was 10 kg/hour. Components were dosed to the hopper as a pre-blend. Extruded strands were cooled in water and granulated. The compositions have been collected in Table 1.

Heat Treatment of the PBT Compositions

Heat treatment of the PBT compositions was performed on a Rotavapor R151 from Büchi. A 10 L glass flask was charged with 2 kg PBT granules and vented with pure, dry nitrogen. Then, the pressure was reduced to 100 Pa and the rotating flask was heated in an oil bath. The temperature of the granules was raised to 185° C. In some of the experiments the granules were kept at this temperature for 5 hours, in other experiments this temperature was kept for 9 hours. This is indicated in Table I. After this period, the oil bath was taken away and the granules cooled to room temperature. Then the cyclic dimer content and $\eta_{rel}$ was measured. The results have been collected in Table I.

Preparation of Test Plates by Injection Moulding

Test specimen were injection molded from pre-dried (10 hours at 115° C. under vacuum with nitrogen flow) granulates on an Engel 80 machine, with temperature settings 230-245° C., and mould temperature of 90° C. A 30 mm screw was used at 126 RPM, injection pressure was 2,6 MPa and plate cycle time was 28 s. The mould was a single sided polished mould, delivering 80 mm×80 mm, 2 mm thick plates.

Testing and Evaluation

Fogging Test

The fogging test was performed in an outgas oven set up (see FIG. 1), equipped with an inside chamber heating system (4) and cover heating system (7) incorporated in a massive aluminum housing (5). The cover heating system (7) was thermally insulated (6) from the inside chamber heating system (4). In the inside chamber heating system (4), the polymer plate to be outgassed (1) was deposited on 4 ceramic sample supports at a height of 7 mm from the bottom of the inside chamber heating system (4). The polymer plate had thickness of 2 mm. The cover heating system was thermally insulated (6) and had a cooling system on top (8) and is fitted with a glass plate at the bottom (2). The height of the upper surface of the polymer plate to the glass plate was 70 mm.

To perform the outgas test, the polymer plate (1) was placed on the sample supports (3) and heated to 160° C., the temperature of the glass plate was set at 70° C. After 20 hours the glass plate was taken out of the cover heating system and the fogging was judged by rating the haziness of the glass plate by eye in a qualitative manner on a scale of 1 to 10, wherein 1 represented very severe fogging and 10 represented no fogging and haziness at all.

The invention claimed is:

1. Polyester composition comprising a polybutylene terephthalate resin (PBT) and at least one additive, wherein the composition has a cyclic dimer content of less than 0.35 wt. % relative to the weight of the PBT, and wherein the cyclic dimer is a cyclic ester product of two butanediol units and two terephthalic acid units.

2. Composition according to claim 1, wherein the PBT has a carboxyl acid number of at most 50 meq/kg relative to the weight of the PBT.

3. Composition according to claim 1, wherein the PBT has a relative viscosity, measured on a 0.5 wt % solution in metacresol at 25° C. (tiret), between 1.7 and 2.3.

4. Composition according to claim 1, wherein the composition comprises at least 50 wt. % PBT, relative to the weight of the composition.

5. Composition according to claim 1, further comprising a lubricant with a weight loss factor, determined by isothermal TGA at 160° C. under nitrogen for 4 hours, of at most 1 wt. %, relative to the weight of the lubricant.

6. Polybutylene terephthalate resin (PBT), wherein the PBT has a cyclic dimer content of less than 0.35 wt. % relative to the weight of the PBT, and wherein the cyclic dimer is a cyclic ester product of two butanediol units and two terephthalic acid units.

7. Polybutylene terephthalate resin according to claim 6, wherein the PBT has a relative viscosity, measured on a 0.5 wt % solution in metacresol at 25° C. ($\eta_{rel}$), between 1.7 and 2.3 and/or an acid number of at most 50 meq/kg relative to the weight of the PBT.

8. Process for the preparation of a polybutylene terephthalate resin (PBT) having a cyclic dimer content of less than 0.35 wt. % relative to the weight of the PBT, wherein the cyclic dimer is a cyclic ester product of two butanediol units and two terephthalic acid units, the process comprising heating a PBT starting material, having a melt temperature and obtained by polymerization above said melt temperature, in solid form in an inert atmosphere to a temperature between 150° C. and said melting temperature, and maintaining the temperature of the PBT within 150° C. and said melting temperature for a time sufficiently long to attain a cyclic dimer content of less than 0.35 wt. %, relative to the weight of the PBT.

9. Process according to claim 8, wherein the inert atmosphere has a pressure of less than 10 kPa and/or wherein a gas stream is applied.

10. Process according to claim 8, wherein the PBT starting material has a relative viscosity measured on a 0.5 wt % solution in metacresol at 25° C. ($\eta_{rel}$), of at most 2.0.

TABLE I

Compositions and fogging test results for Comparative experiment A and B and Examples I-IV

| Composition | Comparative experiment A | Example I | Comparative experiment B | Example II | Example III | Example IV |
|---|---|---|---|---|---|---|
| PBT | 99.6 | 99.6 | 99.6 | 99.6 | 99.6 | 99.6 |
| Pigment Conc. | 0.25 | 0.25 | 0.25 | 0.25 | 0.25 | 0.25 |
| Lubricant A | 0.15 | 0.15 | | | | |
| Lubricant B | | | 0.15 | 0.15 | 0.15 | |
| Lubricant C | | | | | | 0.15 |
| Heat treatment | − | + | − | + | ++ | ++ |
| CD (wt %) | 0.45 | 0.33 | 0.45 | 0.34 | 0.27 | 0.28 |
| Relative viscosity ($\eta$rel) | 1.85 | 1.93 | 1.85 | 1.93 | 2.03 | 2.02 |
| Fogging rating* | 1 | 3-4 | 1-2 | 5 | 7-8 | 9 |

*rating: 10 is excellent; 1 is extremely bad. + 5 hours heat treatment ++ 9 hours heat treatment.

11. Process according to claim 8, wherein the PBT starting material comprises at least one additive, and is obtained by melt polymerization and subsequently mixed with said additive.

12. A method of making a polyester composition comprising preparing a PBT by the process according to claim 8, and thereafter mixing an additive with the PBT to form the polyester composition.

13. A method of making a moulded part comprising molding a polyester composition according to claim 1 to form the moulded part.

14. Moulded part comprising a polyester composition according to claim 1.

15. Moulded part according to claim 14, wherein the moulded part is a bezel for a headlight, a reflector for a headlight or a base for an energy saving lamp.

16. Mirror optic system comprising a moulded part according to claim 14.

17. Mirror optic system according to claim 16, wherein the mirror optic system is a headlight for a motor vehicle or a garden reflector lamp.

18. Motor vehicle comprising a mirror optic system according to claim 16.

19. Motor vehicle according to claim 18, wherein the vehicle is a truck, a passenger's car or a motorbike.

* * * * *